United States Patent
Jin et al.

(10) Patent No.: US 10,315,406 B2
(45) Date of Patent: Jun. 11, 2019

(54) FILM-LIKE STRUCTURE, FILM REMOVING DEVICE AND FILM REMOVING METHOD

(71) Applicants: BOE TECHNOLOGY GROUP CO., LTD., Beijing (CN); Hefei Xinsheng Optoelectronics Technology Co., Ltd., Hefei, Anhui (CN)

(72) Inventors: Xuequan Jin, Beijing (CN); Yachao Tong, Beijing (CN); Gu Yao, Beijing (CN); Linlin Wang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/824,577

(22) Filed: Nov. 28, 2017

(65) Prior Publication Data

US 2018/0272686 A1    Sep. 27, 2018

(30) Foreign Application Priority Data

Mar. 27, 2017 (CN) .......................... 2017 1 0187271

(51) Int. Cl.
 B32B 43/00 (2006.01)
 B32B 38/10 (2006.01)

(52) U.S. Cl.
 CPC ............ B32B 38/10 (2013.01); B32B 43/006 (2013.01); *B32B 2305/34* (2013.01); *B32B 2457/20* (2013.01); *Y10T 156/1168* (2015.01); *Y10T 156/1978* (2015.01)

(58) Field of Classification Search
 None
 See application file for complete search history.

(56) References Cited

U.S. PATENT DOCUMENTS

2003/0000635 A1* 1/2003 Anker ............... H01L 21/67092
156/718
2003/0211652 A1* 11/2003 Summers .......... H01L 21/67144
438/106

(Continued)

FOREIGN PATENT DOCUMENTS

| CN | 1426056 A | 6/2003 | |
| CN | 206067049 U | 4/2017 | |
| WO | WO-2012161501 A2 * | 11/2012 | ............ B01J 23/755 |

OTHER PUBLICATIONS

Machine Translation of Chinese Patent Publication CN1426056. (Year: 2018).*

(Continued)

*Primary Examiner* — Mark A Osele
(74) *Attorney, Agent, or Firm* — Kinney & Lange, P.A.

(57) ABSTRACT

A film-like structure, a film removing device and a film removing method are provided. The film-like structure includes a thin film, and a to-be-removed film arranged on the thin film and having a magnetic region. The film removing device includes: a working table provided with a support surface onto which the film-like structure is placed; and a film moving mechanism provided with a magnetic member and configured to remove the to-be-removed film from the thin film of the film-like structure through a magnetic force.

15 Claims, 3 Drawing Sheets

(56) References Cited

U.S. PATENT DOCUMENTS

| | | | |
|---|---|---|---|
| 2004/0168764 A1* | 9/2004 | Anker | H01L 21/67092 156/706 |
| 2010/0109199 A1* | 5/2010 | Krishnan | B32B 43/006 264/334 |
| 2010/0154992 A1 | 6/2010 | Feinstein et al. | |
| 2014/0209250 A1* | 7/2014 | Kawagoe | B32B 43/006 156/701 |

OTHER PUBLICATIONS

Machine Translation of Korean Patent Publication KR10-1188988. (Year: 2018).*
First Chinese Office Action dated Aug. 3, 2018, for corresponding Chinese Application No. 201710187271.6.

* cited by examiner

FILM-LIKE STRUCTURE, FILM REMOVING DEVICE AND FILM REMOVING METHOD

CROSS-REFERENCE TO RELATED APPLICATION

The present application claims priority to the Chinese patent application No. 201710187271.6 filed on Mar. 27, 2017, which is incorporated herein by reference in its entirety.

TECHNICAL FIELD

The present disclosure relates to the manufacture of display devices, in particular to a film-like structure, a film removing device and a film removing method.

BACKGROUND

As a common, leading packaging mode for a display device in the related art, a metallic thin film packaging technology merely uses one glass substrate and one piece of metallic film, so a resultant product has a relatively small thickness. However, in the case that the metallic thin film packaging technology is used, it is necessary to remove a protection film having a viscous thin film. In the related art, an adhesive tape is clamped by a mechanical arm having a clamping function, and then the tape is adhered onto an edge of the protection film, so as to physically draw off the protection film. For this removing method, it is necessary to align the adhesive tape with the edge of the adhesive thin film, and an alignment success rate is closely related to a condition of the edge of the adhesive thin film. In actual use, a cutting precision error may occur for the adhesive thin film, so an alignment failure rate is very high. In addition, a film removal effect may be adversely affected by a position of the adhesive thin film, a clamping mode of the mechanical arm, a clamping force and viscosity of the tape.

Hence, there is an urgent need to provide a new film removing scheme, so as to solve the above-mentioned problems.

SUMMARY

An object of the present disclosure is to provide a film removing scheme at a high success rate without positioning.

In one aspect, the present disclosure provides in some embodiments a film-like structure, including: a thin film; and a to-be-removed film arranged on the thin film and having a magnetic region.

In a possible embodiment of the present disclosure, a magnetic portion of the to-be-removed film is made of a magnetic material.

In a possible embodiment of the present disclosure, the to-be-removed film includes a body and a magnetic part arranged at least at an edge of the body.

In another aspect, the present disclosure provides in some embodiments a film removing device, including: a working table provided with a support surface onto which the film-like structure is capable of being placed; and a film removing mechanism provided with a magnetic member and configured to remove the to-be-removed film from the thin film of the film-like structure through a magnetic force.

In a possible embodiment of the present disclosure, the magnetic region is arranged at an edge of the to-be-removed film.

In a possible embodiment of the present disclosure, the film removing device further includes an adsorption mechanism provided with at least one adsorption hole in the support surface, wherein the adsorption mechanism is configured to adsorb the film-like structure placed onto the support surface through the adsorption hole.

In a possible embodiment of the present disclosure, the adsorption mechanism includes the adsorption mechanism includes a vacuum pumping device, a vacuum pipe and a vacuum valve; the vacuum pumping device is connected to the adsorption hole through the vacuum pipe, and configured to apply a negative pressure to the adsorption hole; and the vacuum valve is configured to open or close the vacuum pipe.

In a possible embodiment of the present disclosure, the film removing mechanism further includes a mechanical arm and a first driving mechanism; the magnetic member is fixed onto the mechanical arm through the first driving mechanism; and the first driving mechanism is configured to control the magnetic member to move in a first direction.

In a possible embodiment of the present disclosure, the first direction is perpendicular to the support surface.

In a possible embodiment of the present disclosure, the film removing device further includes a second driving mechanism, wherein the working table is arranged on the second driving mechanism; the second driving mechanism is configured to control the working table to move in a second direction; the second direction is parallel to the support surface and perpendicular to the first direction.

In a possible embodiment of the present disclosure, the film removing mechanism further includes: a roller; a driving device configured to drive the roller to rotate about a central axis of the roller; an electromagnetic induction coil wound onto the roller; and a control circuit configured to supply electric current to the electromagnetic induction coil.

In a possible embodiment of the present disclosure, the film removing mechanism further includes a buffer layer arranged on the roller and covering the electromagnetic induction coil.

In yet another aspect, the present disclosure provides in some embodiments a film removing method for use in the above-mentioned film removing device, including: placing the above film-like structure onto the support surface of the working table; and enabling, by the film removing mechanism, the to-be-removed film to be removed from the thin film of the film-like structure through the magnetic force.

In a possible embodiment of the present disclosure, the film removing method further includes: during the removal of the to-be-removed film, supplying, by the control circuit, electric current to the electromagnetic induction coil, and driving, by the driving device, the roller to rotate in a third direction; and after the removal of the to-be-removed film, stopping, by the control circuit, the supply of the electric current to the electromagnetic induction coil, and driving, by the driving device, the roller to rotate in a fourth direction until the to-be-removed film of the film-like structure is removed from the roller, wherein one of the third direction and the fourth direction is a counterclockwise direction, and the other one of the third direction and the fourth direction is a clockwise direction.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

An object of the present disclosure is to provide a new film removing scheme, so as to solve the problems in the related art.

Figure 1:
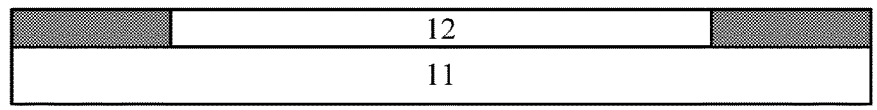
FIG. 1 is a schematic view showing a film-like structure according to one embodiment of the present disclosure.

The present disclosure provides in some embodiments a film-like structure which, as shown in FIG. 1, includes: a thin film 11 (which is not limited to a layer structure in FIG. 1); and a to-be-removed film 12 arranged on the thin film 11 and having a magnetic region (a hatched portion in FIG. 1).

According to the film-like structure in the embodiments of the present disclosure, the to-be-removed film may be removed from an edge thereof through a magnetic force, without directly contacting the film-like structure, so it is able to prevent the film-like structure from being damaged. In addition, through the magnetic interaction within a certain range, it is unnecessary to position the to-be-removed film using a mechanical arm before the contact like that in the related art, thereby to improve the film removal efficiency and the film removal success rate.

The to-be-removed film may be provided with magnetism at its edge in various ways. For example, a portion of the to-be-removed film at its edge may be made of a magnetic material, and during the manufacture of the to-be-removed film, magnetic particles may be doped into the to-be-removed film in the related art, so as to provide the to-be-removed film with magnetism.

In a possible embodiment of the present disclosure, a magnetic member (e.g., a magnetic tape) may be connected to an edge of a body of the to-be-removed film, so as to provide the to-be-removed film with magnetism without changing its material. In this way, it is able to prevent a manufacture process in the related art from being greatly affected, thereby to facilitate the implementation thereof.

In actual use, the film-like structure may be a film structure packaged with a metallic thin film, or any other product, a film on which needs to be removed. In other words, the thin film 11 may be one or more functional films as a part of the product in the related art, and the to-be-removed film 12 is used to protect the thin film 11 temporarily. The to-be-removed film 12 does not serve as a part of the product, and thus it needs to be removed subsequently.

For example, in the case that the film-like structure is applied to a display substrate in the related art, the thin film 11 may include some functional patterns on the display substrate, e.g., patterns of signals lines or electrodes. The to-be-removed film 12 may be used to package the display substrate temporarily, so as to prevent these functional patterns from being damaged.

In addition, the magnetic region of the to-be-removed film is at least arranged at the edge of the to-be-removed film, so as to remove the to-be-removed film from its edge through the magnetic force. Of course, alternatively, any portion of the to-be-removed film other than its edge, or even the entire to-be-removed film, may be provided with magnetism.

The film-like structure has been described as above.

Figure 2:
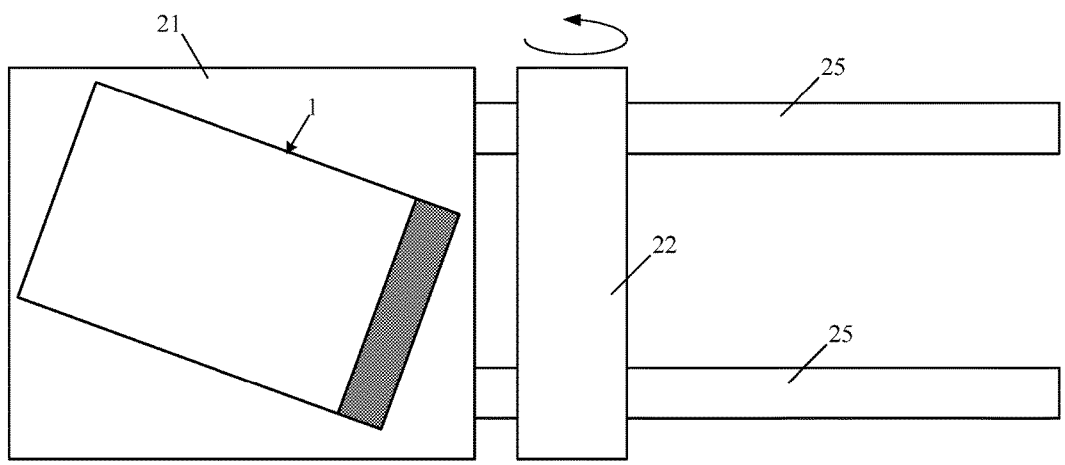
FIG. 2 is a top view of a film removing device according to one embodiment of the present disclosure.

Correspondingly, the present disclosure further provides in some embodiments a film removing device which, as shown in FIG. 2, includes: a working table 21 provided with a support surface onto which the above-mentioned film-like structure 1 is placed; and a film removing mechanism 22 provided with a magnetic member and configured to remove a to-be-removed film from the thin film of the film-like structure 1 through a magnetic force of the magnetic member.

According to the embodiments of the present disclosure, the to-be-removed film may be removed by the magnetic force of the film removing device, such that it is unnecessary for the film removing device to be in direct contact with the film-like structure. In addition, it is unnecessary to position the to-be-removed film using the mechanical arm like that in the related art. As a result, it is able to remarkably improve the film removal success rate and the film removal efficiency.

Figure 3:
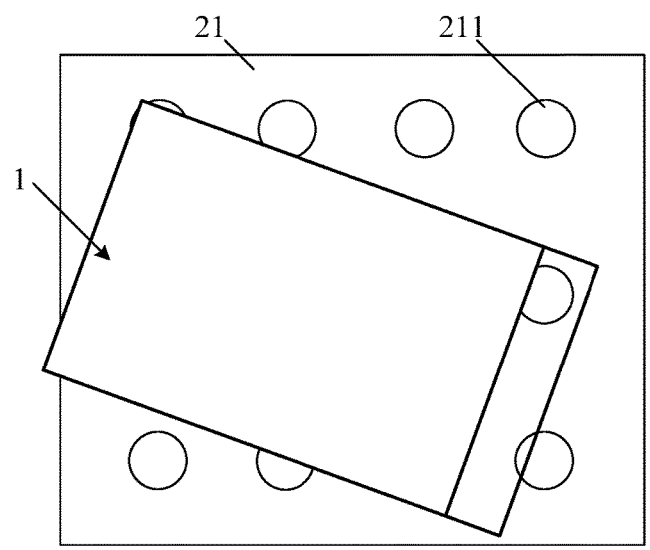
FIG. 3 is a schematic view showing a support surface of a working table of the film removing device according to one embodiment of the present disclosure.

In a possible embodiment of the present disclosure, in order to firmly fix the film-like structure onto the support surface 21, as shown in FIG. 3, the film removing device may further include an adsorption mechanism provided with adsorption holes 211 in the support surface of the working table 21 and configured to adsorb the film-like structure 1 placed onto the support surface through the adsorption holes 211, so as to prevent the film-like structure 1 from be deviated from its original position during the removing process.

Figure 7:
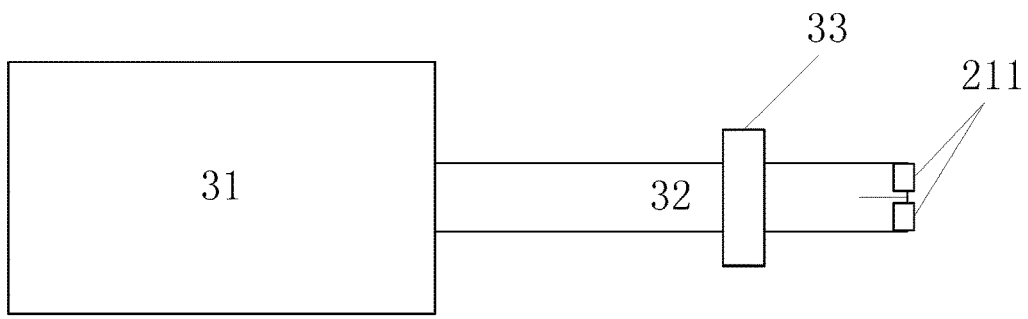
FIG. 7 is a schematic view showing an adsorption mechanism according to one embodiment of the present disclosure.

For example, in actual use, as shown in FIG. 7, the adsorption mechanism may include a vacuum pumping device 31, a vacuum pipe 32 and a vacuum valve 33. The vacuum pumping device is connected to the adsorption holes 211 through the vacuum pipe and configured to apply a negative pressure to the adsorption holes 211. The vacuum valve 33 is configured to open or close the vacuum pipe 32.

Figure 4:
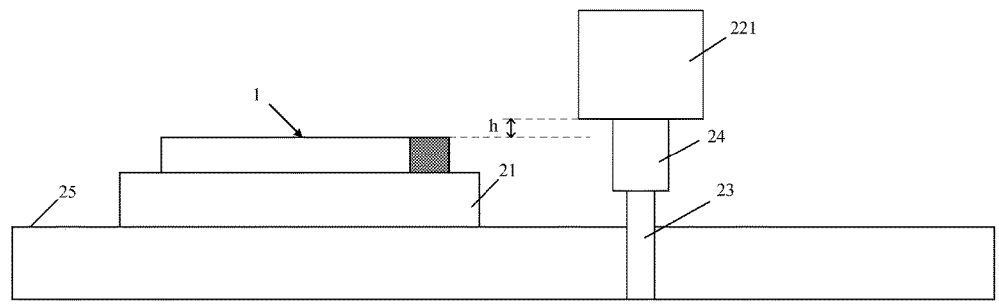
FIG. 4 is a side view of the film removing device according to one embodiment of the present disclosure.

In addition, as shown in FIG. 4, the film removing device may further include a mechanical arm 23 and a first driving mechanism 24. The magnetic member 221 of the film removing mechanism 22 is fixed onto the mechanical arm 23 through the first driving mechanism 24, and the first driving mechanism 24 is configured to control the magnetic member 221 to move on the mechanical arm 23 in a first direction.

In actual use, the first direction may refer to an axial direction perpendicular to the support surface 21, i.e., the first driving mechanism 24 may be configured to adjust a distance h between the magnetic member 21 and the film-like structure 1 on the support surface. In this regard, it is able for the film removing device to meet the requirement of the film-like structures at different thicknesses, thereby to significantly improve the applicability of the film removing device.

In addition, for example, in actual use, a hydraulic member may be used as the mechanical arm 23 and the first driving mechanism 24, and the magnetic member may move in the first direction along with a telescopic movement of the hydraulic member.

In addition, as shown in FIGS. 3 and 4, the film removing device may further include a second driving mechanism 25, onto which the working table 21 is arranged and which is configured to control the working table 21 to move in a second direction perpendicular to the first direction. In a possible embodiment of the present disclosure, the second direction is parallel to the support surface 21.

Through the second driving mechanism 25, it is able to move the film-like structure 1 on the working table 21 toward the magnetic member 5, thereby to remove the to-be-removed film during the movement.

In actual use, the second driving mechanism 25 may include a guiding rail and a step motor. In other words, the working table may be arranged on the guiding rail, and then driven by the step motor to move in an extension direction of the guiding rail.

In addition, the magnetic member 221 may be an electromagnetic induction coil. By controlling an intensity of electric current applied to the electromagnetic induction coil and the number of turns of the electromagnetic induction coil, it is able to control a magnetic intensity of the electromagnetic induction coil, thereby to flexibly control a force for removing the to-be-removed film.

Figure 5:
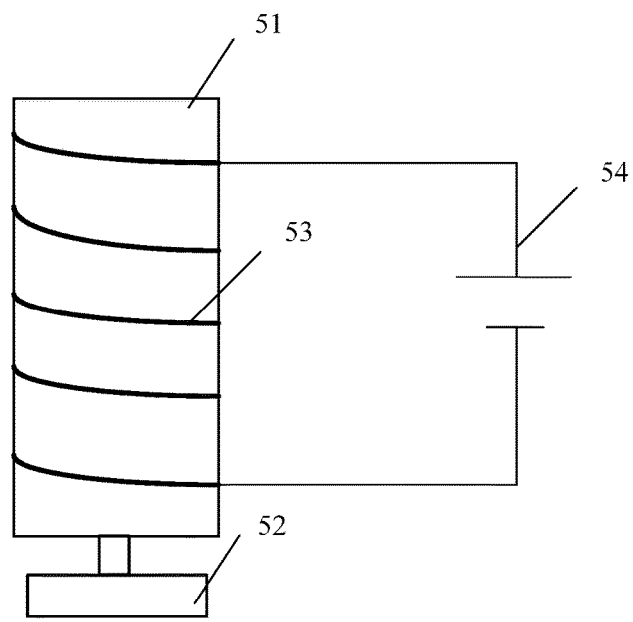
FIGS. 5 and 6 are schematic views showing a magnetic member of the film removing device according to one embodiment of the present disclosure.

To be specific, as shown in FIG. 5, the film removing mechanism may include: a roller 51; a driving device 52 configured to drive the roller 51 to rotate about its central axis; an electromagnetic induction coil 53 wound onto the roller 51; and a control circuit 54 configured to supply electric current to the electromagnetic induction coil 53.

During the removal of the to-be-removed film, the roller 51 rotates about its central axis under the control of the driving device 52, and the electromagnetic induction coil 53 wound onto the roller 51 is energized by the control circuit 54. In the case that the film-like structure 1 on the working table 21 is driven by the second driving mechanism 24 to move below the roller 51, the to-be-removed film may be lifted due to the magnetic force which is generated by the energized electromagnetic induction coil 53 of the roller 51. In addition, after a portion of the to-be-removed film has been adsorbed onto the electromagnetic induction coil 53, the entire to-be-removed film may be rolled up and removed from the film-like structure 1 due to the rotation of the electromagnetic induction coil 53 along with the rotation of the roller 51.

Figure 6:
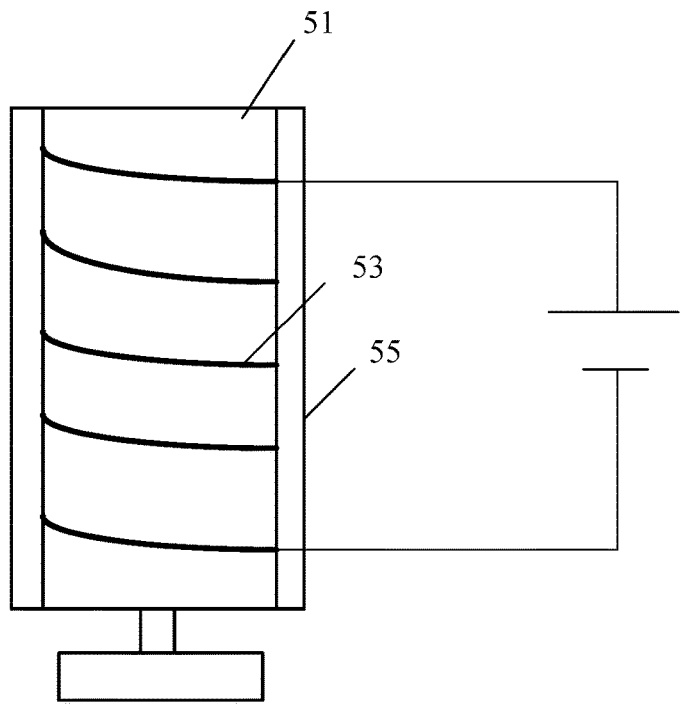

In a possible embodiment of the present disclosure, as shown in FIG. 6, the film removing mechanism further includes a buffer layer 55 arranged on the roller 51 and covering the electromagnetic induction coil 53. The electromagnetic induction coil 53 is in indirect contact with the to-be-removed film through the buffer layer 55, to enable to prevent the to-be-removed film from entering the electromagnetic induction coil 53, thereby to facilitate the removal of the to-be-removed film from the roller 51 after the to-be-removed film is removed from the thin film.

According to the film removing device in the embodiments of the present disclosure, it is able to remarkably remove the film removal efficiency and film removal success rate, thereby to improve the yield of the product for a large-capacity production line.

The above embodiments are for illustrative purposes only, but shall not be used to limit the scope of the present disclosure. In the other possible embodiments of the present disclosure, the electromagnetic induction coil may also be replaced with any other magnetic substance such as lodestone or magnet. Of course, it should be appreciated that, the electromagnetic induction coil is a preferred way.

Figure 8:
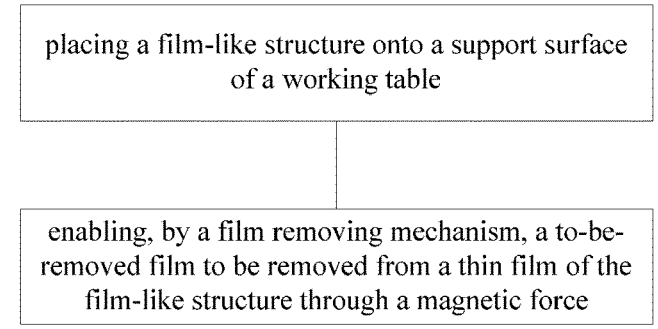
FIG. 8 is a flow chart of a film removing method for use in the film removing device according to one embodiment of the present disclosure.

The present disclosure further provides in some embodiments a film removing method for use in the above-mentioned film removing device which, as shown in FIG. 8, includes steps of: placing the above-mentioned film-like structure onto a support surface of a working table; and enabling, by a film removing mechanism, a to-be-removed film to be removed from the thin film of the film-like structure through a magnetic force.

For example, as shown in FIG. 4, during the removal of the to-be-removed film, the working table 21 and the film-like structure 1 may be driven by the second driving mechanism 25 so as to move toward the magnetic member 221.

Further referring to FIG. 4, during the movement, the electromagnetic induction coil 54 may be energized by the control circuit 54, and the roller 51 may be driven by the driving device 52 to move in a third direction, e.g., a clockwise direction or a counterclockwise direction.

In the case that the film-like structure 1 on the working table 21 is driven by the second driving mechanism to move below the roller 51, the to-be-removed film of the film-like structure 1 may be lifted due to the magnetic force which is generated by the energized electromagnetic induction coil 53 of the roller 51. In addition, after a portion of the to-be-removed film has been adsorbed onto the roller 51 through the magnetic force, the entire to-be-removed film may be rolled up and removed from the film-like structure 1 due to the rotation of the roller 51.

After the removal of the to-be-removed film, the control circuit may stop supplying power to the electromagnetic induction coil 53, and the roller 51 may be driven by the driving device 52 to rotate in a fourth direction opposite to the third direction. In this way, it is able to unwind the to-be-removed film from the roller 51, and separate the film from the roller 51.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A film removing device, comprising:
   a working table provided with a support surface, wherein a film structure is capable of being placed on the support surface, and the film structure comprises: a thin film, and a to-be-removed film arranged on the thin film and having a magnetic region;
   a film removing mechanism provided with a magnetic member and configured to remove the to-be-removed film from the thin film of the film structure through a magnetic force;
   a roller;
   a driving device configured to drive the roller to rotate about a central axis of the roller;
   an electromagnetic induction coil wound onto the roller; and
   a control circuit configured to supply electric current to the electromagnetic induction coil.

2. The film removing device according to claim 1, further comprising:
   an adsorption mechanism provided with at least one adsorption hole in the support surface, wherein the adsorption mechanism is configured to adsorb the film structure placed onto the support surface through the adsorption hole.

3. The film removing device according to claim 2, wherein
   the adsorption mechanism further comprises: a vacuum pumping device, a vacuum pipe and a vacuum valve;
   the vacuum pumping device is connected to the adsorption hole through the vacuum pipe, and configured to apply a negative pressure to the adsorption hole; and
   the vacuum valve is configured to open or close the vacuum pipe.

4. The film removing device according to claim 1, wherein
   the film removing mechanism further comprises:
      a mechanical arm; and
      a first driving mechanism;
   the magnetic member is fixed onto the mechanical arm through the first driving mechanism; and
   the first driving mechanism is configured to control the magnetic member to move in a first direction.

5. The film removing device according to claim 4, wherein
   the first direction is perpendicular to the support surface.

6. The film removing device according to claim 4, further comprising:
   a second driving mechanism,
   wherein the working table is arranged on the second driving mechanism;
   the second driving mechanism is configured to control the working table to move in a second direction;
   the second direction is parallel to the support surface and perpendicular to the first direction.

7. The film removing device according to claim 1, wherein the film removing mechanism further comprises:
   a buffer layer arranged on the roller and covering the electromagnetic induction coil.

8. The film removing device according to claim 1, wherein
   the magnetic region comprises an edge of the to-be-removed film.

9. The film removing device according to claim 8, further comprising:
   an adsorption mechanism provided with at least one adsorption hole in the support surface, wherein the adsorption mechanism is configured to adsorb the film structure placed onto the support surface through the adsorption hole.

10. The film removing device according to claim 9, wherein
    the adsorption mechanism further comprises:
       a vacuum pumping device;
       a vacuum pipe; and
       a vacuum valve;
    the vacuum pumping device is connected to the adsorption hole through the vacuum pipe, and configured to apply a negative pressure to the adsorption hole; and
    the vacuum valve is configured to open or close the vacuum pipe.

11. The film removing device according to claim 8, wherein
    the film removing mechanism further comprises:
       a mechanical arm; and
       a first driving mechanism;
    the magnetic member is fixed onto the mechanical arm through the first driving mechanism; and
    the first driving mechanism is configured to control the magnetic member to move in a first direction.

12. The film removing device according to claim 11, further comprising:
    a second driving mechanism,
    wherein the working table is arranged on the second driving mechanism;
    the second driving mechanism is configured to control the working table to move in a second direction;
    the second direction is parallel to the support surface and perpendicular to the first direction.

13. The film removing device according to claim 8, wherein the film removing mechanism further comprises:
    a buffer layer arranged on the roller and covering the electromagnetic induction coil.

14. A film removing method using the film removing device according to claim 1, wherein the film removing method comprises:
    placing the film structure onto the support surface of the working table,
    wherein the film structure comprises:
       the thin film; and
       the to-be-removed film arranged on the thin film and having the magnetic region; and
    enabling, by the film removing mechanism, the to-be-removed film to be removed from the thin film of the film-like structure through the magnetic force.

15. The film removing method according to claim 14, further comprising:
    during the removal of the to-be-removed film, supplying, by the control circuit, electric current to the electromagnetic induction coil, and driving, by the driving device, the roller to rotate in a third direction; and
    after the removal of the to-be-removed film, stopping, by the control circuit, the supply of the electric current to the electromagnetic induction coil, and driving, by the driving device, the roller to rotate in a fourth direction until the to-be-removed film of the film structure is removed from the roller, wherein one of the third direction and the fourth direction is a counterclockwise direction, and the other one of the third direction and the fourth direction is a clockwise direction.

* * * * *